B. LINDEMANN.
TRACTION DEVICE.
APPLICATION FILED NOV. 25, 1912.
1,079,501.
Patented Nov. 25, 1913.
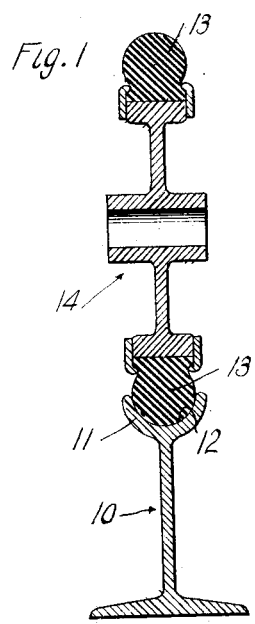
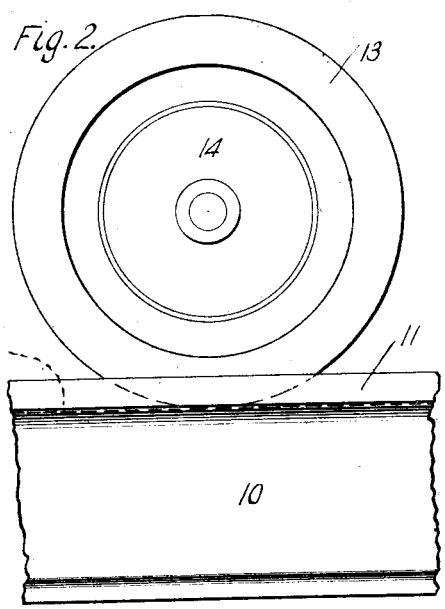
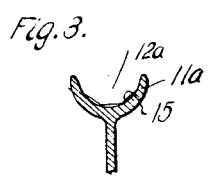
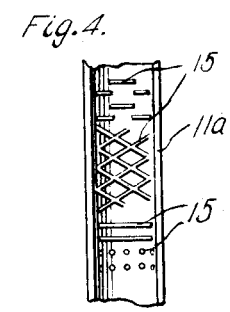
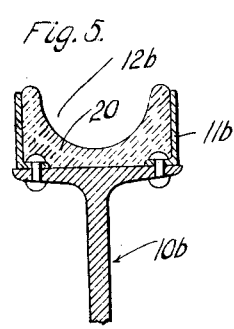
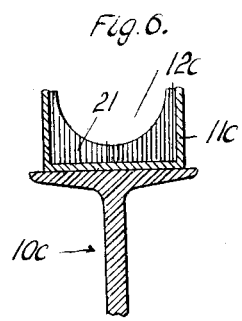
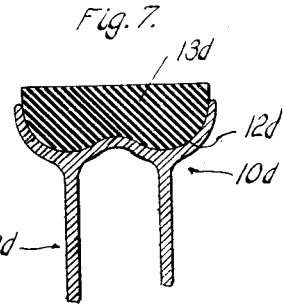
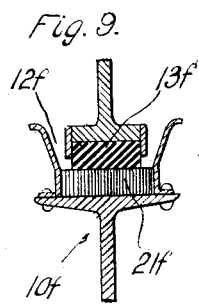
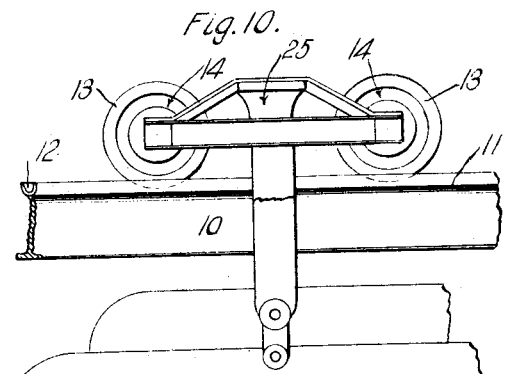
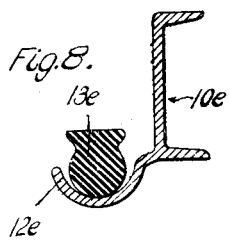
Inventor:
Berthold Lindemann,
by James T. Bankelew
his Attorney.
Witnesses:
Elwood H. Bankelew
F. A. Danford

UNITED STATES PATENT OFFICE.

BERTHOLD LINDEMANN, OF LOS ANGELES, CALIFORNIA, ASSIGNOR TO LOS ANGELES TRUST & SAVINGS BANK, TRUSTEE, OF LOS ANGELES, CALIFORNIA, A CORPORATION OF CALIFORNIA.

TRACTION DEVICE.

1,079,501.  Specification of Letters Patent.  Patented Nov. 25, 1913.

Application filed November 25, 1912. Serial No. 733,241.

*To all whom it may concern:*

Be it known that I, BERTHOLD LINDEMANN, a citizen of the United States, residing at Los Angeles, in the county of Los Angeles, State of California, have invented new and useful Improvements in Traction Devices, of which the following is a specification.

This invention relates to an improved traction—a combination of a rail and traction wheel; and it is of the more important objects of the invention to provide a device which will give a large amount of traction, and which will obviate all vibrations; jar and shocks, and all consequent disadvantages attendant upon ordinary traction devices. My invention is intended to give greater adhesion by reason of its peculiar action; and it also obviates all the ordinary disagreeable noise.

Fundamentally, my invention consists in the combination of a rail member and a track wheel member having a grooved and a convex surface respectively, the convex surface (whether of the track or the wheel) being made of a relatively soft, pliable or resilient material. The tread surfaces of the two members are so made as to coöperate with each other to produce a great adhesion and tractive effect; and in a typical form of my invention the wheel tread is expanded by the weight carried to fill the groove of the rail so that the traction adhesion increases as the weight on the wheel increases. In this preferred form of device I may use a rail which has an upper longitudinal groove (preferably of generally semi-circular cross section but it may be of any convenient construction) and the wheel has a correspondingly shaped rim or tread portion which fits into the groove. This rim or tread portion is made of a comparatively soft and pliable or resilient material. The material may be rubber in some cases; and in others it may be of such a substance as fiber or the like. The weight imposed upon the traction wheel forces the tread or tire of the wheel down into the groove and causes it to expand to tightly fill the groove; and this affords a large amount of traction. At the same time, the pliable and resilient qualities of the tire completely obviate all jar, vibration and attendant noise; and the running of the wheel on the track becomes much quieter and smoother than is now ordinarily the case, largely on account of lateral pliability or resiliency of the tire taking up any shock which might otherwise be transmitted from a poor road bed to the wheels and then to the structure carried thereon. This is one of the important features of my invention, as it allows of higher speeds being attained without the liability of the wheels leaving the track by lateral movement. All of these features and advantages will become more readily apparent from the following specification taken in connection with the accompanying drawings, in which:

Figure 1 is a vertical cross section of my improved combination. Fig. 2 is a side elevation of the same. Figs. 3 and 4 are views showing a modified form of the track member of my combination. Figs. 5 and 6 are views showing further modified forms of the track. Fig. 7 is a sectional view showing a modified form of the combination, this form being typical of other forms hereinafter set forth. Fig. 8 is a modified form view, showing a tire fitting loosely in the track groove. Fig. 9 is a modified form view, showing a flat wheel tire. Fig. 10 is a view diagrammatically illustrating the application of my novel combination to an over-head rail system, to which my device is peculiarly adapted.

In the drawings I have shown a rail 10, which may be made of any convenient cross-sectional configuration, the rail preferably having a longitudinally grooved upper member 11 which carries the groove 12 in which the tread 13 of wheel 14 is adapted to engage. (It will be understood that, although I refer to an upper groove in the rail, this groove may be placed in any relative position. Fig. 8 shows the groove at the side of the lower edge of the rail 10ᵉ.) The tread 13 I preferably make, as hereinbefore stated, of a pliable flexible or resilient and springy material, such as rubber, fiber or the like. The tread 13 is preferably, as shown in Figs. 1, 3 and 7, of the same cross sectional configuration as groove 12 so that it fits more or less closely therein and has a traction contact surface along the entire cross section within the groove. The tire 13 may be made so as to be removable and replaceable so that the wheel 14 may be used indefinitely by renewing its tread. If the tread be made of a resilient and flexible material, it is seen that weight on the wheel will compress the tread into the groove 12 and will cause it to expand tightly against the walls of the groove, thus greatly increasing the tractive adhesion. (Under no load the tire may fit the groove more or less loosely, such as shown in Fig. 8.)

If it becomes necessary for any reason to provide other traction means than the mere pressure of the tire 15 on the smooth surface of the groove, that surface may be modified. For instance, as shown in Figs. 3 and 4, it is possible to provide the groove with corrugations 15; these corrugations being of any approved form. When the corrugations are used, the tire 13 (particularly if it is of rubber or similar substance) sinks into the spaces between the corrugations and forms in effect a gear wheel traveling over a rack. This will insure good and positive traction. On the other hand, to prevent any slipping, it may be advisable to insert in the groove, either over its smooth surface as shown in Fig. 1, or between the corrugations shown in Figs. 2 and 4, a compound or other substance which will create a large frictional effect between the tire and the track.

In the use of rubber against steel, it may be highly effective to use a certain resin compound in a thin coating over the groove. Or, I may make arrangements for attaining friction by some such means as is typically illustrated in Figs. 5 and 6. I may make the rail as is illustrated in these figures, surmounting it with a suitable box 11ᵇ or 11ᶜ which may contain a filling of concrete 20 or wood 21. The concrete, or the wood, will be formed with the groove 12ᵇ or 12ᶜ; and the surface of the groove may then cause greatly better tractive adhesion with the wheel rims. Other substances may be substituted for concrete or wood, depending largely upon the exact nature of the substance used for the tire 13 on the wheel. For instance, when rubber is used for the tire, there will probably be some particular substance or substances which will give the best results in combination therewith; and when fiber or some similar substance is used for the wheel tire, an entirely different substance may give the best results in the rail.

As before stated I may vary the constructional configuration of the rail and tire; and I have illustrated in Fig. 7 a typical variation. This figure shows a rail 10ᵇ having an upper longitudinal groove 11ᵇ which is formed in two parallel portions with a longitudinal raise or ridge between them. The tire 13ᵇ would be correspondingly made.

In Figs. 8 and 9 I have shown an application of my combination including a grooved rail and tire fitting loosely therein. In Fig. 8 I have shown a rail 10ᵉ having a groove 12ᵉ at its lower edge, this placement having advantages in the way of hanging a suspended car close to the wheels. In Fig. 9 I have shown a flat tire 13ᶠ on a flat insert 21ᶠ, the tire running loosely in the groove 12ᶠ on rail 10ᶠ.

In Fig. 10 I have illustrated the application of my combination to an overhead track arrangement. Here I have shown the typical arrangement of two wheels 14 mounted on a truck 25, which truck may carry suspended a car or any other desired structure. I believe that my new combination is particularly adapted to overhead track arrangements of this kind. Heretofore it has been difficult to obtain in suspended monorails sufficient traction for grades and for high speeds; but my device completely obviates the former deficiency.

Consideration of the foregoing will lead to an understanding of the merits of my device. The use of a comparatively strong, pliable or resilient tire or wheel tread entirely obviates all of the usual noise, jar and vibration attendant ordinary traction devices. The use of this pliable rim in a grooved rail leads directly to those traction advantages herein before explained; the tractive adhesion becoming greater as the load on the wheel increases. And, lastly, I will point out that the use of the pliable tire affords means for absorbing lateral shock which might otherwise be transmitted to the wheels from lateral variations in the rails; the tire being distorted laterally momentarily to take up any such inequalities. The general absorption of shock and vibration not only prevents the suspended car from jar when passing over the rail joints, crossings, etc., it eradicates crystallization of the rails and other deleterious effects on the road bed.

Having described my invention, I claim:

1. In combination, a track and a traction wheel thereon, one of said members having a groove therein and the other having a tread portion adapted to snugly fit into said groove, the tread portion being composed of relatively pliable material.

2. In combination, a track and a traction wheel thereon, one of said members having a groove therein and the other having a tread portion adapted to snugly fit into said groove, the groove portion being composed of relatively hard material, and the tread portion being composed of relatively pliable resilient material.

3. In combination, a relatively hard rail having an upper longitudinal groove, and a traction wheel having a tread portion of relatively pliable material fitting into the groove and simultaneously contacting with the sides and bottom of said groove.

4. In combination, a metallic rail having an upper longitudinal groove, and a traction wheel having a tread portion of rubber fitting into the groove and simultaneously contacting with the sides and bottom of said groove.

5. In combination, a metallic rail having an upper longitudinal groove, and a traction wheel having a removable tread portion of rubber fitting into the groove and simultaneously contacting with the sides and bottom of said groove.

6. In combination, a metallic rail having an upper longitudinal groove with a friction surface therein, and a traction wheel having a tread portion of rubber fitting into the groove and simultaneously contacting with the sides and bottom of said groove.

7. In combination, a metallic rail having an upper longitudinal groove, a frictional material inserted in the rail and forming a part of the groove wall, and a traction wheel having a tread portion of rubber fitting into the groove and having simultaneous contact with the sides and bottom of said groove.

8. In combination a grooved track member and a traction wheel member adapted to move in said track and having simultaneous contact with the sides and bottom of the grooved track, the tread portion of one of said members being of high elasticity and the tread portion of the other member being of low elasticity.

9. In combination, a grooved metallic track and a traction wheel, and a tire for the wheel fitting into the said groove and having both radial and lateral resiliency and having simultaneous contact with the bottom and sides of the grooved track.

In witness that I claim the foregoing I have hereunto subscribed my name this 18th day of November 1912.

BERTHOLD LINDEMANN.

Witnesses:
 E. J. CASS,
 ELWOOD H. BARKELEW.